(12) United States Patent
Bender

(10) Patent No.: US 7,302,843 B2
(45) Date of Patent: Dec. 4, 2007

(54) MASS AIR FLOW HOUSING FOR MASS AIR FLOW SENSOR

(75) Inventor: Lee Frederick Bender, Huntsville, AL (US)

(73) Assignee: C & L Performance, Inc., Huntsville, AL (US)

( * ) Notice: Subject to any disclaimer, the term of this patent is extended or adjusted under 35 U.S.C. 154(b) by 134 days.

(21) Appl. No.: 11/184,751

(22) Filed: Jul. 19, 2005

(65) Prior Publication Data

US 2007/0021049 A1    Jan. 25, 2007

(51) Int. Cl.
*G01F 1/68* (2006.01)
(52) U.S. Cl. .................................. 73/202.5
(58) Field of Classification Search ............ 73/202.5, 73/204, 204.21, 204.22; 29/421.1
See application file for complete search history.

(56) References Cited

U.S. PATENT DOCUMENTS

| | | | |
|---|---|---|---|
| 4,304,128 A | 12/1981 | Hafner et al. | |
| 4,393,697 A | 7/1983 | Sato et al. | |
| 4,571,996 A * | 2/1986 | Wakeman et al. | ......... 73/202.5 |
| 4,911,009 A | 3/1990 | Maeda et al. | |
| 5,048,327 A | 9/1991 | Atwood | |
| 5,253,517 A | 10/1993 | Molin et al. | |
| D343,364 S | 1/1994 | Beulke | |
| D343,365 S | 1/1994 | Beulke | |
| D349,862 S | 8/1994 | Hausler et al. | |
| D350,491 S | 9/1994 | Hausler et al. | |
| 5,355,726 A | 10/1994 | Zurek et al. | |
| 5,563,340 A | 10/1996 | Clowater et al. | |
| 6,336,360 B1 | 1/2002 | Weber | |
| 6,422,070 B2 | 7/2002 | Reymann et al. | |
| 6,474,177 B2 | 11/2002 | Maeda et al. | |
| 6,708,561 B2 | 3/2004 | Zurek et al. | |
| 6,959,476 B2 * | 11/2005 | Li et al. | ............ 29/421.1 |
| 7,000,463 B1 * | 2/2006 | Shajii et al. | ............... 73/202.5 |

FOREIGN PATENT DOCUMENTS

| | | |
|---|---|---|
| JP | 2000-050695 A | 2/2000 |
| JP | 2001-314099 A | 11/2001 |
| JP | 2002-250641 A | 9/2002 |

* cited by examiner

*Primary Examiner*—Jewel Thompson
(74) *Attorney, Agent, or Firm*—Lanier Ford Shaver & Payne P.C.; Angela Holt

(57) ABSTRACT

A housing structure for improving air flow to the intake manifold of an internal combustion engine is claimed. The present invention is a replacement part for a factory-installed mass air flow sensor housing and is designed to allow for larger air flow through the housing through the use of a bypass air passage or calibration tube that reduces air flow as experienced by the mass air flow sensor. The calibration tube reduces air flow across the sensor with a larger bore on its inlet and a restriction in its outlet. The calibration tube is angled to reduce back flow from the engine.

17 Claims, 7 Drawing Sheets

MASS AIR FLOW HOUSING FOR MASS AIR FLOW SENSOR

BACKGROUND

1. Field of the Invention

The invention relates generally to the field of mass air flow measurement. More particularly, the invention relates to a housing for a mass air flow sensor used for measuring the mass of a medium flowing in a line, in particular the intake air mass of automobile internal combustion engines.

2. Background of the Invention

Mass air flow sensors are used to measure air intake into an automobile's internal combustion engine in order to optimize fuel delivery to the engine. Specifically, the engine's control module needs to know the intake air volume to calculate the engine load so that it can determine how much fuel to inject, when to ignite the cylinder, and when to shift the transmission. Thus the mass air flow sensor is a critically important sensor for achieving optimal engine control. Without this information, the engine's control module would not know how much fuel to add to the engine.

A mass air flow sensor works by converting the amount of air that it samples from the air drawn into the engine into a voltage signal. Large amounts of air flow into the intake of the engine can cause the sensor to exceed its voltage range. This poses a problem for individuals wishing to increase engine performance by increasing the air flow into the engine's intake manifold. Often individuals desiring increased engine performance replace factory-installed intake manifold components with components that will allow greater air flow to the engine, but the voltage limit of the mass air flow sensor can be a problem, because when the voltage limit of the mass air flow meter is exceeded, the engine's control module will assume that there is something wrong with the engine, and the vehicle's "check engine" light may come on and there may even be damage to the engine, depending upon how the automobile's computer tries to correct the detected off-nominal situation.

One way to configure the mass air flow sensor so that increased air flow in the intake manifold does not exceed the mass air flow sensor's maximum voltage is to lessen the air flow that the sensor experiences while increasing the actual air flow to the engine. As an initial matter, the mass air flow sensor does not experience the full load of air flowing into the intake manifold even in the factory-installed engines. In other words, the sensor is not just sitting in the main air flow path sampling the incoming air. Rather, in most inlet tracts the sensor samples the air flow through a calibrated tube that is part of the mass air flow meter housing and is designed to sample only a portion of the air into the manifold. By changing the calibration tube's size, location and configuration, a user can force a lesser air flow to the mass air flow sensor and therefore "trick" the engine into thinking the flow into the engine is less than it is in reality. The present invention achieves this objective by providing a mass air flow sensor housing that allows increased air flow to the engine while decreasing air flow across the sensor.

Another problem with the operation of mass air flow sensors is that their readings can be affected by reverse flow or back flow of air in the direction opposite of air intake. This back flow often causes inaccurate air flow readings because typical mass air flow sensors detect the flow of the air in both the forward and reverse directions relative to air intake. Prior art mass fluid and air flow devices have attempted to reduce or eliminate back flow. For example, U.S. Pat. No. 4,393,697, entitled "Air Flow Rate Measuring Apparatus," teaches an air flow rate measuring apparatus having an air flow sensor and a temperature sensor which are disposed in a bypass passage for intake air formed in the vicinity of a main air flow guide chamber in an internal combustion engine. This prior art invention provides protection against back flow in the bypass passage because the air is introduced at right angles into the main passage from the output of the bypass passage. A disadvantage of this invention was that it required a complex mass air flow housing casting that was not inserted into the main air flow path.

U.S. Pat. No. 5,355,726, entitled "Housing for Reducing Back Air Flow to Mass Air Flow Sensors," reduces back air flow by channeling the sampled air through a "stair-stepped" bypass passage similar to the simplified cross section shown in FIG. 1, which is a prior art mass flow meter housing (from the intake manifold of a 1996-2001 Ford Mustang®). This prior art design successfully reduces back air flow pressure into the calibration tube, but, as can be seen from the simplified cross-section in FIG. 2, the bypass passage's bisecting of the air flow path decreases air flow through the housing and into the intake manifold. FIG. 3 is a simplified cross-section of another prior art mass flow meter housing (from the intake manifold of a 1989-93 Ford Mustang®) showing the reduced air flow area caused by the bypass passage to the mass air flow sensor.

It would be desirable to have mass air flow sensor housing that addresses all of the goals of increasing air flow to the intake manifold for increased engine performance while also decreasing air flow to the mass air flow sensor, and reducing back flow into the calibration tube, all with a simplified casting design.

SUMMARY OF THE INVENTION

It is therefore an object of the present invention to provide a replacement housing structure for a mass air flow sensor for an internal combustion engine that maximizes air flow through the housing into the intake manifold of the engine.

It is a further object of the present invention to provide a replacement housing for a mass air flow meter for an internal combustion engine that decreases air flow as experienced by the mass air flow sensor.

It is another object of the present invention to provide a replacement housing for a mass air flow meter for an internal combustion engine that reduces back air flow into the calibration tube of the mass air flow sensor.

The present invention achieves these goals with a housing tube that is installed between the inlet air filter and the throttle body of the engine's inlet air manifold. The housing tube has a maximized area for air flow and a calibration tube with an increased inlet bore to reduce the air flow across the sensor with an angled and restricted outlet that serves to further decrease air flow across the mass air flow sensor and reduces back air flow into the calibration tube.

DETAILED DESCRIPTION

Figure 1:
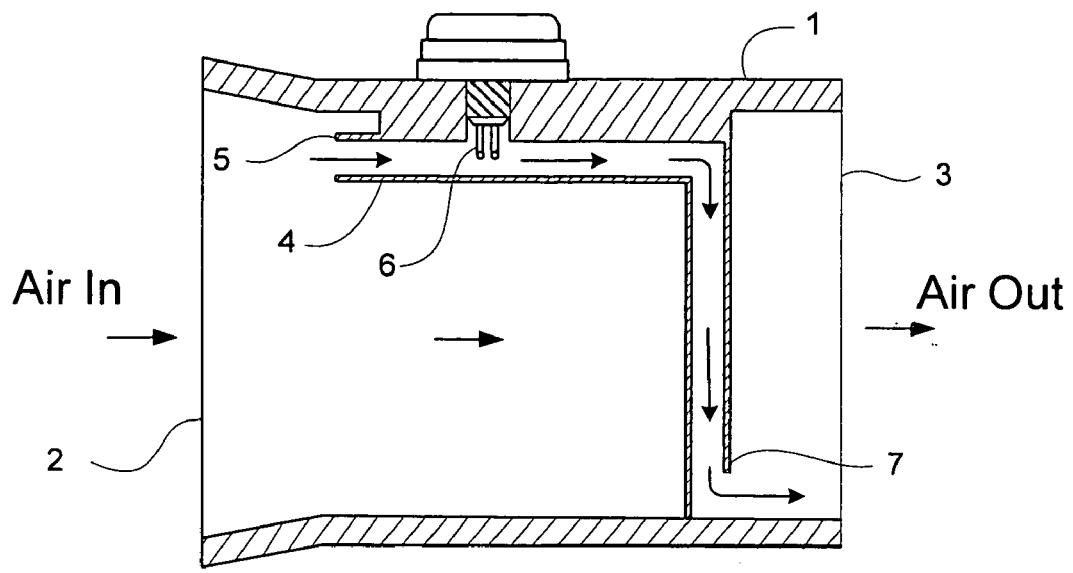
FIG. 1 is a simplified lengthwise cross section of the length of a prior art mass air flow housing from the intake manifold of a 1996-2001 Ford Mustang®.
Figure 2:
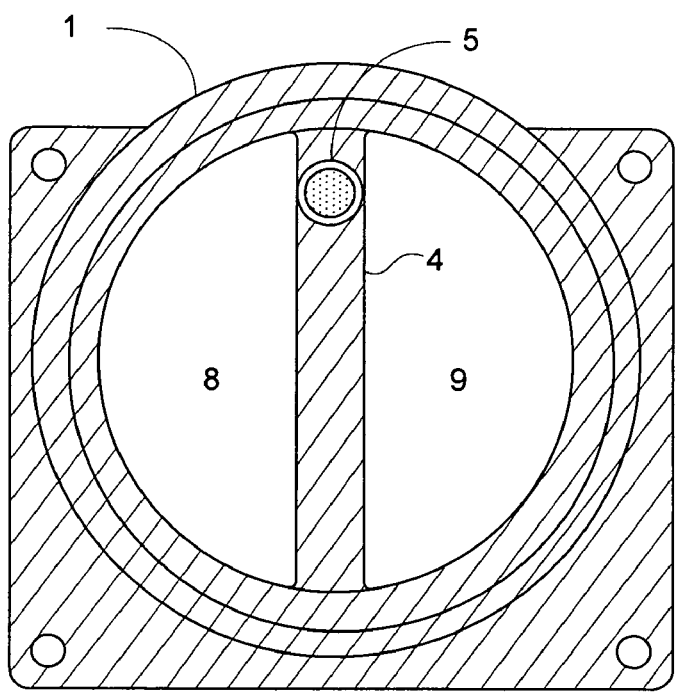
FIG. 2 is a simplified lengthwise cross section of a prior art mass air flow housing from the intake manifold of a 1996-2001 Ford Mustang®.

The present invention and its advantages are best understood by referring to the drawings. The elements of the drawings are not necessarily to scale, emphasis instead being placed upon clearly illustrating the principles of the invention. Throughout the drawings, like numerals are used for like and corresponding parts of the various drawings FIG. 1 is a simplified lengthwise cross section of a prior art mass air flow housing from the intake manifold of a 1996-2001 Ford Mustang®. The mass air flow housing 1 operates by moving air from the inlet 2 of the housing to the outlet 3 of the housing. A bypass calibration tube or sample tube 4 redirects a portion of the air flow through an inlet nozzle 5 and then "stair-steps" down to an outlet nozzle 7. The mass air flow sensor 6 samples the air flow at the first "horizontal" portion of the calibration tube 4. The purpose of the "stair-stepping" of the bypass calibration tube 4 (as opposed to a straight tube) is to decrease the possibility of back air flow from the engine reaching the sensor 6 from the outlet 3 of the housing. The transverse cross section of FIG. 2 shows how this area used by the bypass calibration tube 4 sacrifices a significant area for air flow and also temporarily splits the air flow area into two separate paths 8 and 9. These features reduce the air flow into the intake manifold of the engine.

Figure 3:
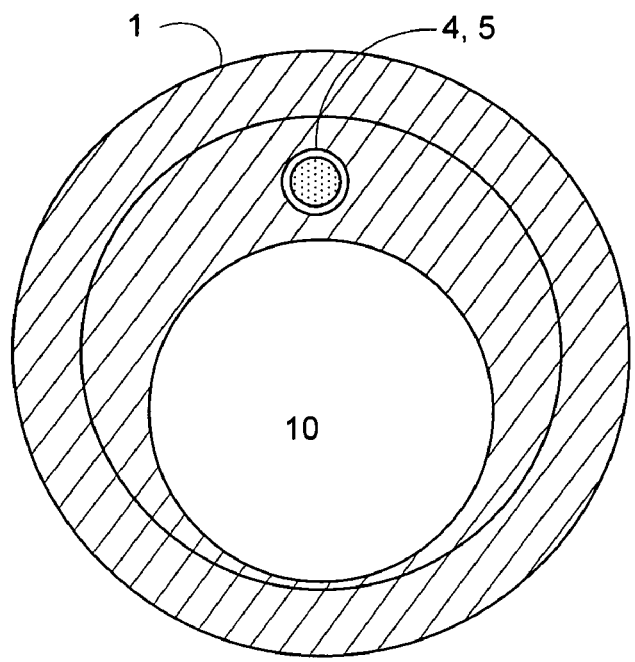
FIG. 3 is a simplified transverse cross section of a prior art mass flow meter housing from the intake manifold of a 1989-93 Ford Mustangs®.

FIG. 3 is a simplified transverse cross section of a prior art mass flow meter housing from the intake manifold of a 1989-93 Ford Mustang®. In this prior art design, the area for air flow 10 through the housing 1 is drastically reduced by a restricted circular opening that leaves room for the calibration tube's inlet nozzle 5.

Figure 4:
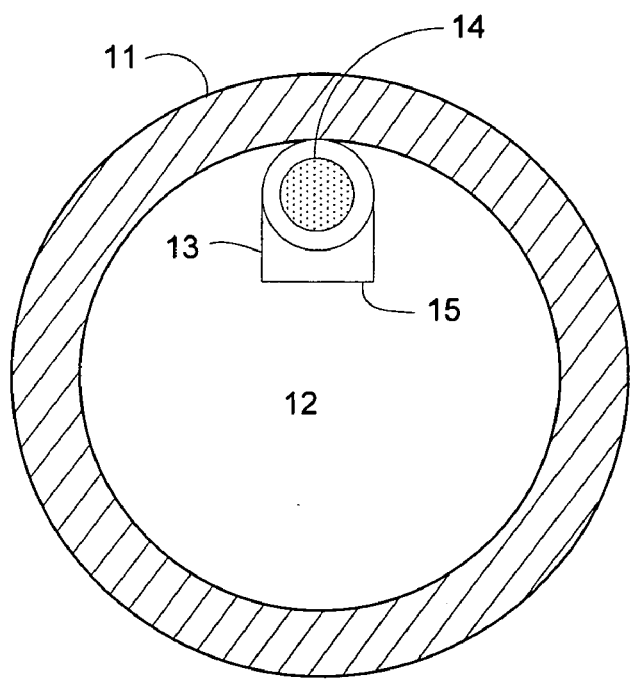
FIG. 4 is a simplified transverse cross section of an exemplary mass air flow housing of the present invention.

In contrast to these prior art mass air flow housing tubes, the present invention maximizes air flow through the housing to the engine's inlet manifold, as shown in the simplified transverse cross section of one embodiment of the present invention shown in FIG. 4. As is shown in this figure, the air flow area 12 through the housing 11 is restricted only by the small volume of the calibration tube 13.

Figure 5:
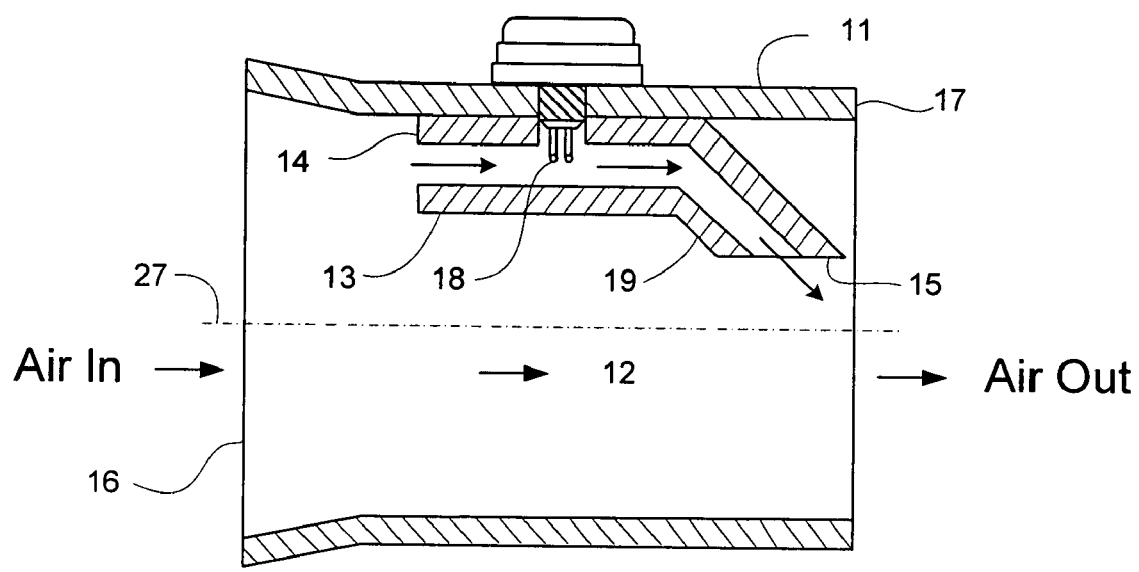
FIG. 5 is a simplified lengthwise cross section of an exemplary mass air flow housing of the present invention.

FIG. 5 is a simplified lengthwise cross section of this embodiment. Like the prior art inventions, the mass air flow housing 11 of the present invention operates by moving air from the inlet 16 of the housing to the outlet 17 of the housing. In this embodiment, a calibration tube or sample tube 13 that is substantially parallel to the longitudinal axis 27 of the main air flow passage redirects a portion of the air flow through a generally circular inlet nozzle 14 and then transitions (at an angle of about forty-five (45) degrees, though angles of between about thirty (30) and about seventy (70) degrees are possible in other embodiments) down to an outlet nozzle 15. The mass air flow sensor has a sensing head 18 that extends into the calibration tube 13 to sample the air flow at the portion of the calibration tube 13 that is parallel to the longitudinal axis 27 of the main air flow passage. The purpose of the angled portion 19 of the calibration tube 13 is to reduce back air flow from the engine.

In addition, the angled portion 19 of the calibration tube 13 extends down towards the center of the housing 11 in order to sample air from near the center of the housing 11, where the air flow is not affected by conditions that may direct air flow towards certain regions of the inside of the housing. Such conditions may be caused by sharp turns in the air inlet plumbing either before or after the mass airflow housing or in cases where the mass airflow housing is mounted either on its side or upside down in custom performance applications. By sampling air from near the center of the housing 11, the calibration tube 13 avoids areas of concentrated air flow that would increase the voltage of the mass air flow sensor.

The prior art mass air flow housings of FIGS. 1-3 have a calibration tube 4 with a circular inlet nozzle 5 having an inside diameter of 0.385 inches, while the embodiment of the present invention shown in FIGS. 4 and 5 has an inlet nozzle 14 inside diameter of about 0.485 inches, though an inside diameter within the range of about 0.48 to about 0.65 inches would also provide similar results. The purpose of the larger inlet nozzle inside diameter is to reduce the speed of the air flow through the calibration tube 13.

Figure 6:
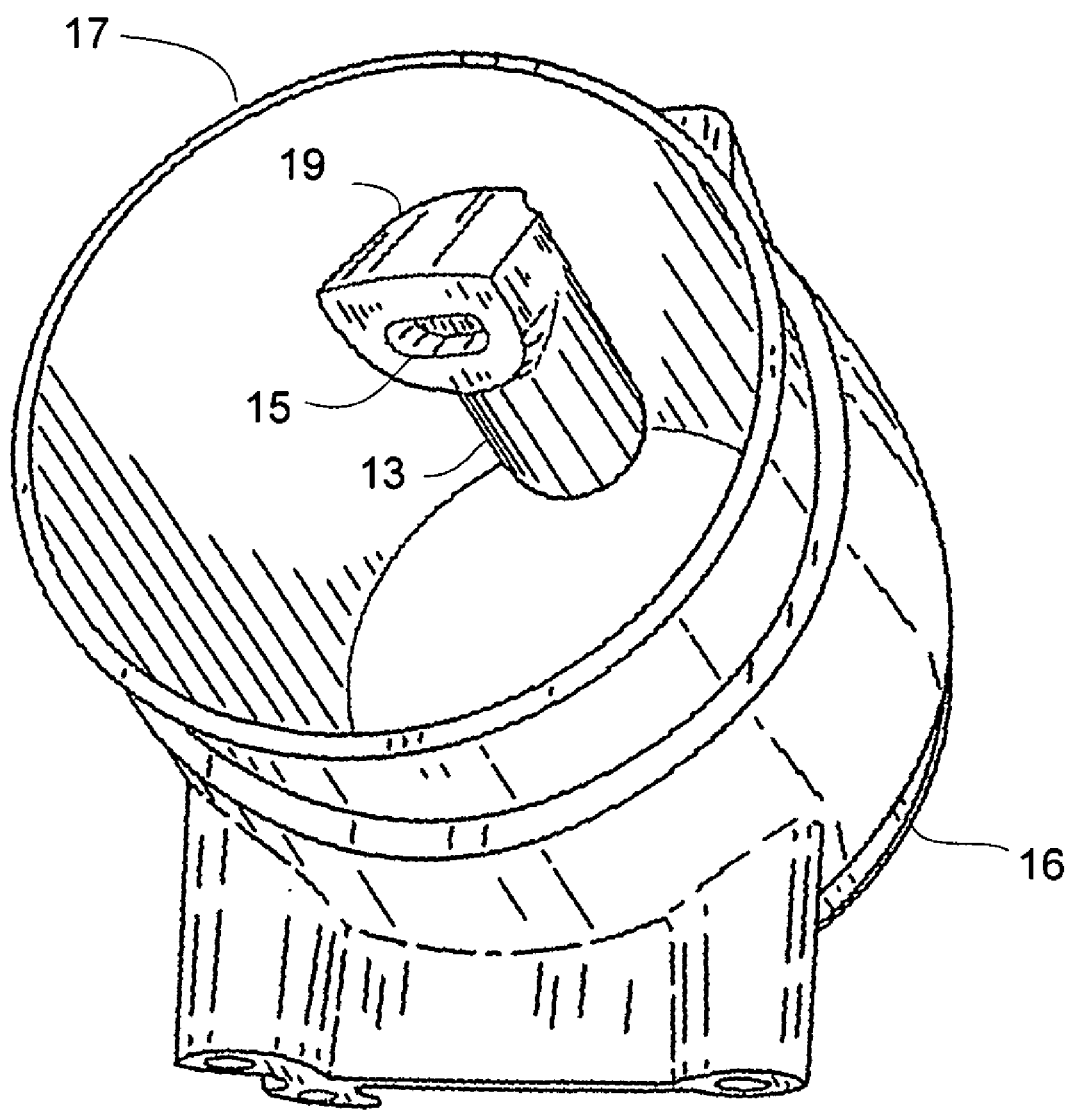
FIG. 6 is a rear perspective view of one embodiment of the invention.
Figure 7:
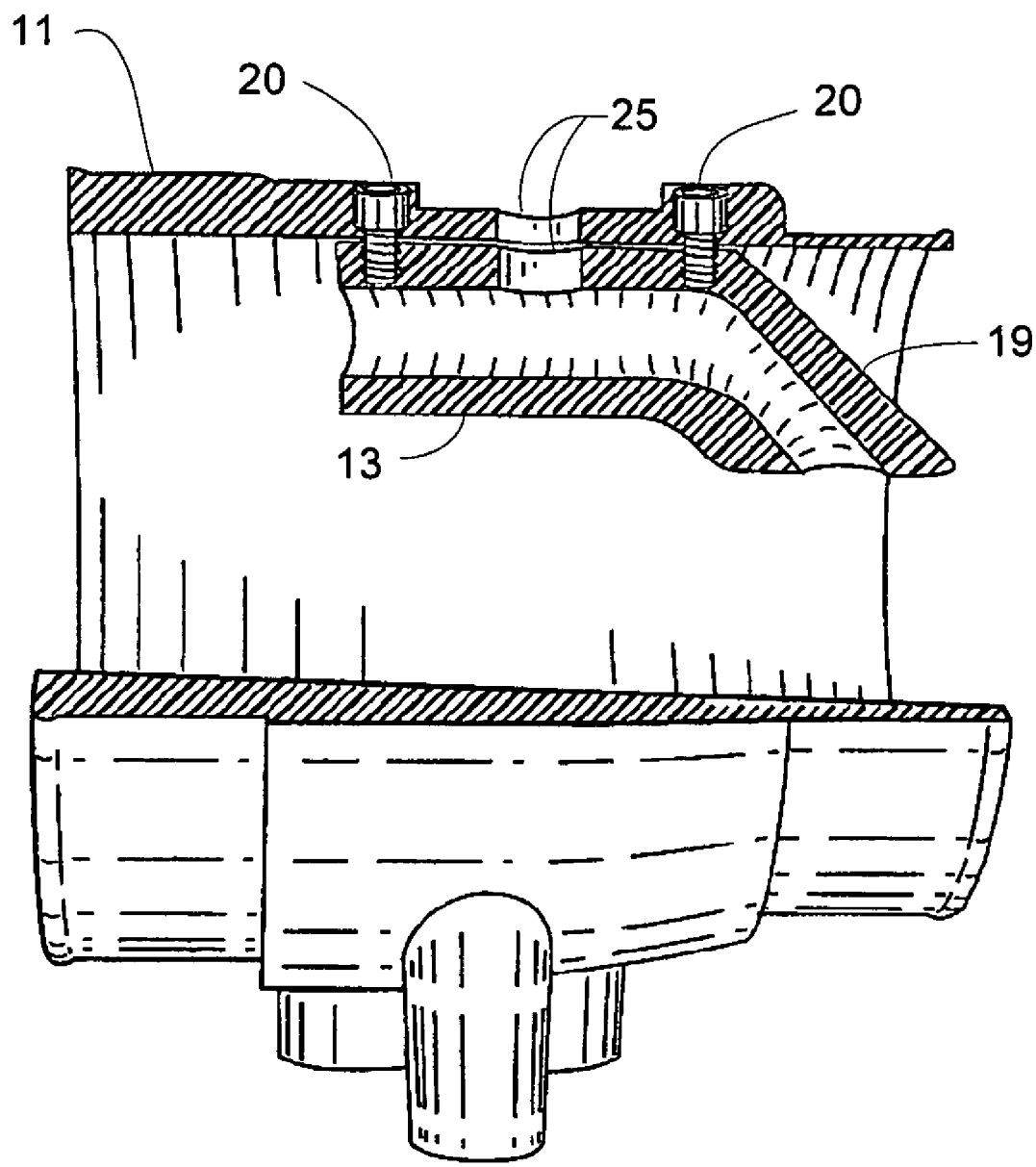
FIG. 7 is a partial lengthwise cross section of the mass air flow housing of one embodiment of the present invention.

In this embodiment of the invention, the outlet nozzle opening 15 is an oblong shape (rather than circular as is the inlet nozzle opening 14), as is shown in FIG. 6. In this embodiment, the rounded portion of the outlet nozzle opening 15 is about 0.485 inches in diameter, and the "flat" portion measures about 0.250 across. The smaller cross-sectional area of the outlet nozzle opening 15 is substantially uniform throughout the angled portion 19 of the calibration tube 13, and this restriction in the calibration tube 13 (as compared with larger diameter of the portion of the calibration tube 13 that is parallel to the longitudinal axis of the housing 11) further reduces the air flow as experienced by the mass air flow sensor 18. FIG. 7 further illustrates the calibration tube 13 and shows the restriction in the angled portion 19 of the tube 13. As is shown in this figure, the calibration tube 13 of the exemplary embodiment is a separate part from the housing 11 and is attached to the housing 11 via screws 20. Aligned holes 25 in the housing 11 and the calibration tube 13 allow for the sensor head of the mass air flow sensor to extend into the calibration tube 13.

Figure 8:
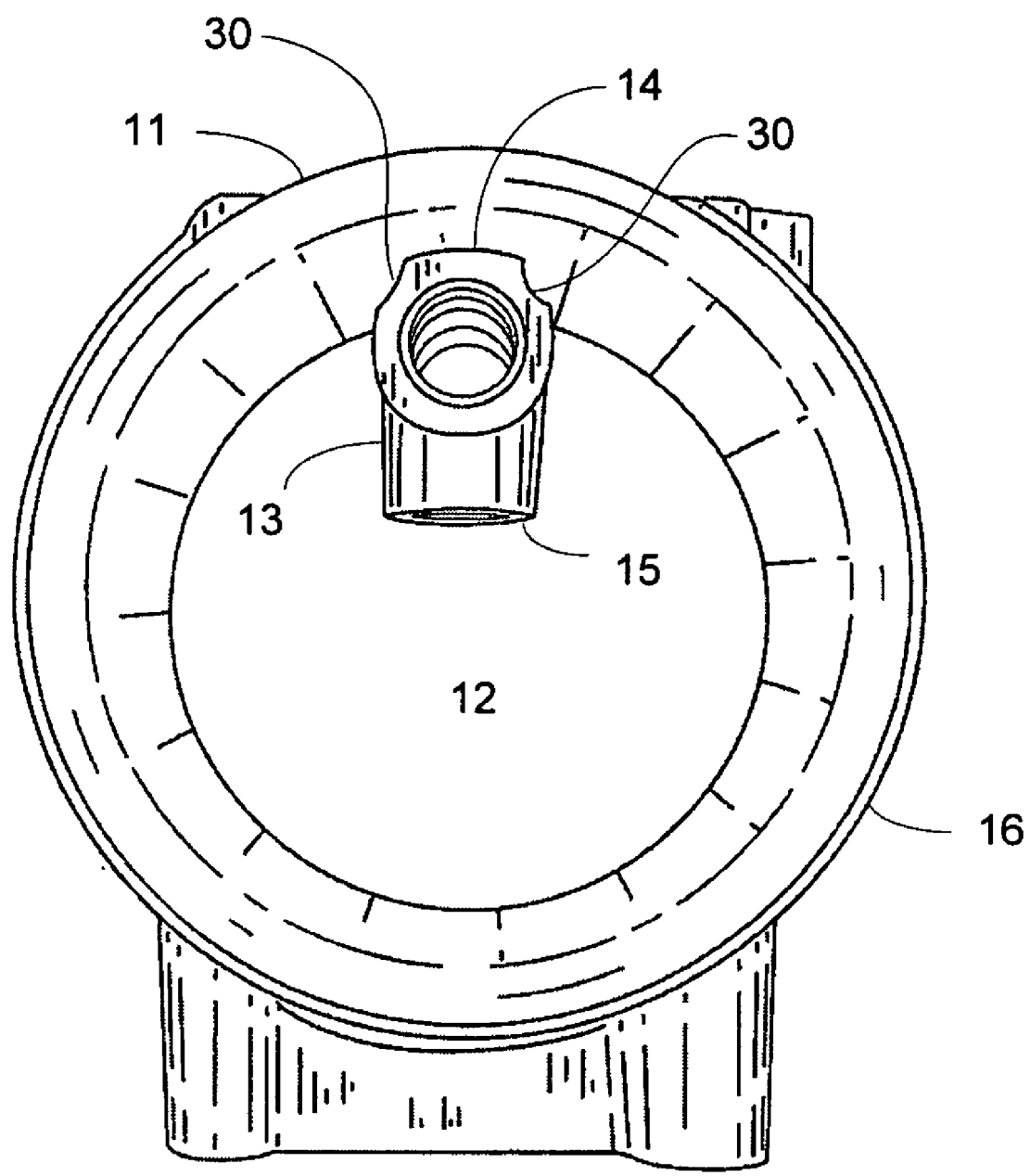
FIG. 8 is a front elevational view of one embodiment of the invention.

FIG. 8 is a front elevational view of one embodiment of the present invention. Semi-circular "cut-outs" 30 on the outside of the calibration tube 13 serve to decrease the surface area of the calibration tube, thus increasing the air flow through the housing 11. The inventive housing 11 and the calibration tube 13 may be made of cast aluminum, though other metals and materials may be used, such as steel, ceramic, and durable, heat-resistant plastic.

Figure 9:
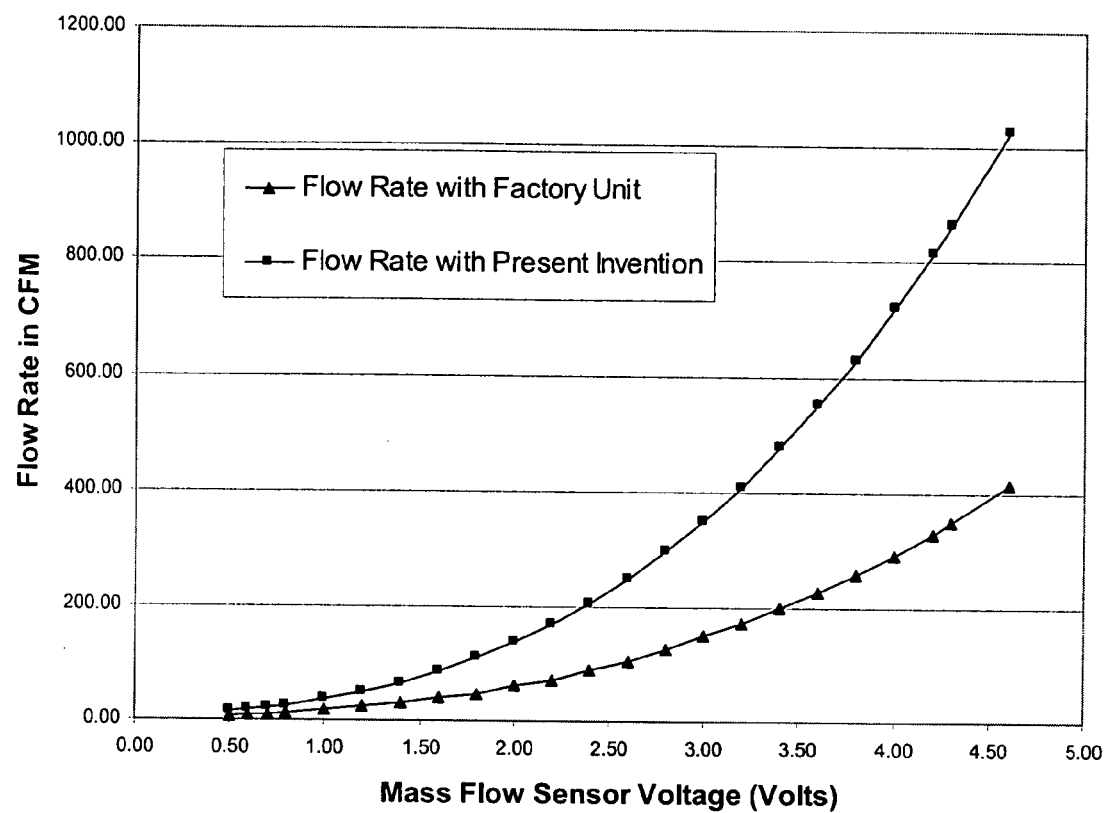
FIG. 9 is a chart comparing the flow rates and mass flow sensor voltages with a factory-installed mass air flow sensor housing versus the present invention.

The improvement of the present invention over a factory-installed mass air flow sensor housing in terms of air flow rate into the engine is illustrated in FIG. 9, which compares the mass air flow rate sensor voltage experienced by a sensor installed in the housing of the present invention versus a factory-installed housing. As can be seen in this figure, the flow rate barely exceeds 400 CFM with the factory-installed housing but exceeds 1000 CFM with the present invention, an increase of more than 100% of air flowing into the engine's intake manifold. The present invention was designed as a replacement part for mass airflow-equipped Ford® vehicles manufactured between 1988 and 2001, and other foreign applications that were originally equipped with a Hitachi®—manufactured hot wire based mass airflow sensor.

This invention may be provided in other specific forms and embodiments without departing from the essential characteristics as described herein. The embodiment described is to be considered in all aspects as illustrative only and not restrictive in any manner. The following claims rather than the foregoing description indicate the scope of the invention.

As described above and shown in the associated drawings, the present invention comprises a mass air flow housing for a mass air flow sensor. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention

What is claimed is:

1. An assembly for a mass air flow sensor comprising:
   a housing having a main air flow passage extending therethrough, the housing having an interior surface, an inlet end, an outlet end and a longitudinal axis;
   a bypass air tube on the interior surface of the housing, the bypass air tube having an inlet segment and an outlet segment,
      wherein the inlet segment is substantially parallel to the longitudinal axis and contains an opening to receive the mass air flow sensor,
      and the outlet segment is disposed at an angle to the inlet segment and extends towards the center of the main air flow passage.

2. The assembly of claim 1, wherein the outlet segment constricts the air flown through the bypass air tube.

3. The assembly of claim 1, wherein the angle is between about thirty degrees and about seventy degrees.

4. The assembly of claim 3, wherein the angle is about forty-five degrees.

5. The assembly of claim 1, wherein the inlet segment has an interior diameter between about 0.48 and about 0.65 inches.

6. The assembly of claim 5, wherein the inlet segment has an interior diameter of about 0.485 inches.

7. The assembly of claim 1, wherein the housing and the bypass air tube are made of cast aluminum.

8. The assembly of claim 1, wherein the assembly is dimensioned as a replacement part for mass airflow-equipped Ford® vehicles manufactured between 1988 and 2001.

9. The assembly of claim 1, wherein the assembly is dimensioned as a replacement part for internal combustion engines that were originally equipped with a Hitachi®—manufactured hot wire based mass airflow sensor.

10. An assembly for a mass air flow sensor comprising:
    a housing having a main air flow passage extending therethrough, the housing having an interior surface, an inlet end, an outlet end and a longitudinal axis;
    a bypass air tube connected to the interior surface of the housing, the bypass air tube having an inlet segment and an outlet segment,
       wherein the inlet segment is substantially parallel to the longitudinal axis and has a cross-sectional diameter of about 0.485 inches and contains an opening to receive the mass air flow sensor,
       and the outlet segment is disposed at an angle about forty-five degrees to the inlet segment and extends towards the center of the main air flow passage, and wherein the outlet segment constricts the air flow through the bypass air tube; and
    wherein the housing and the bypass air tube are made of cast aluminum.

11. A bypass air tube for a mass air flow sensor comprising:
    an inlet segment and an outlet segment,
    wherein the inlet segment contains an opening to receive the mass air flow sensor,
    and the outlet segment is disposed at an angle to the inlet segment and extends towards the center of the main air flow passage.

12. The bypass air tube of claim 11, wherein the outlet segment constricts the air flow through the bypass air tube.

13. The bypass air tube of claim 11, wherein the angle is between about thirty and about seventy degrees.

14. The bypass air tube of claim 11, wherein the angle is about forty-five degrees.

15. The bypass air tube of claim 11, wherein the inlet segment has an anterior diameter of between about 0.48 and about 0.65 inches.

16. The bypass air tube of claim 15, wherein the inlet segment has an anterior diameter of about 0.485 inches.

17. The bypass air tube of claim 11, wherein the housing and the bypass air tube are made of cast aluminum.

* * * * *